United States Patent [19]

Schönauer

[11] Patent Number: 6,068,336
[45] Date of Patent: May 30, 2000

[54] ADJUSTMENT MECHANISM FOR THE SIDE SUPPORT PANELS OF A SEAT BACK

[75] Inventor: Alexander Schönauer, Geisenfeld, Germany

[73] Assignee: Bertrand Faure Sitztechnik GmbH & Co. KG., Stadthagen, Germany

[21] Appl. No.: 09/190,980

[22] Filed: Nov. 12, 1998

[30] Foreign Application Priority Data

Nov. 13, 1997 [DE] Germany .................... 197 50 116

[51] Int. Cl.$^7$ ........................................... A47C 7/14
[52] U.S. Cl. ........................ 297/284.9; 297/284.1; 297/284.4
[58] Field of Search .............. 297/284.1, 284.4, 297/284.9, 284.2, 452.18, 452.34, 452.29

[56] References Cited

U.S. PATENT DOCUMENTS

| | | | |
|---|---|---|---|
| 4,155,592 | 5/1979 | Tsuda et al. | 297/284.4 X |
| 4,500,136 | 2/1985 | Murphy et al. | 297/284.9 |
| 4,536,030 | 8/1985 | Sakurada et al. | 297/284.9 |
| 4,537,444 | 8/1985 | Maruyama et al. | 297/284.9 |
| 4,607,887 | 8/1986 | Vail | 297/284.9 X |
| 4,627,661 | 12/1986 | Ronnhult et al. | 297/284.4 |
| 4,636,000 | 1/1987 | Nishino | 297/284.9 |
| 4,679,855 | 7/1987 | Hattori et al. | 297/284.9 X |
| 4,697,848 | 10/1987 | Hattori et al. | 297/284.9 X |
| 4,895,412 | 1/1990 | Deley et al. | 297/284.9 |
| 4,924,162 | 5/1990 | Sakamoto et al. | 297/284.9 |
| 4,938,526 | 7/1990 | Fourrey | 297/284.9 |
| 5,316,375 | 5/1994 | Breen | 297/284.9 X |
| 5,328,236 | 7/1994 | Mizushima et al. | 297/284.9 |
| 5,425,569 | 6/1995 | Hayes | 297/284.9 X |
| 5,449,219 | 9/1995 | Hay et al. | 297/284.4 |
| 5,474,358 | 12/1995 | Maeyaert | 297/284.4 X |
| 5,697,672 | 12/1997 | Mitchell | 297/284.4 |
| 5,823,620 | 10/1998 | Le Caz | 297/284.4 |
| 5,857,743 | 1/1999 | Ligon, Sr. et al. | 297/284.9 |

FOREIGN PATENT DOCUMENTS

| | | | |
|---|---|---|---|
| 2596335 | 10/1987 | France | 297/284.9 |
| 2603980 | 8/1976 | Germany | 297/284.4 |
| 141341 | 5/1990 | Japan . | |

Primary Examiner—Peter M. Cuomo
Assistant Examiner—Rodney B. White
Attorney, Agent, or Firm—White & Case LLP

[57] ABSTRACT

A mechanism for adjusting the position of the side support panels of a seat back comprises a pair of projecting side frame members which are secured at one end against rotation relative to the seat back frame. At least that portion of each side frame member near to the attached end is made of spring steel, so that side frame members can be cantilevered toward or away from one another, against the force of the spring steel, about axes which are substantially parallel to one another. Preferably, each side frame member has a generally U-shaped configuration so as to have a pair of generally parallel legs and terminates in end portions which are fixedly secured relative to said seat back frame. In a preferred embodiment, each end portion includes a first end portion perpendicular to the leg portion, a second end portion which extends from the first end portion at least generally parallel to the leg portion, and a third end portion which extends at least generally parallel to the first end portion. A first bearing, which is fixed to the seat back frame, has a hole through which the first end portion passes. A second bearing, which is also fixed to the seat back frame, secures the third end portion, thereby opposing any rotational movement of the first end portion, such that the first end portion acts as a torsional spring. Preferably, the positions of the side frame members are adjusted using a rotary knob coupled to a drum, by securing a cord member between the drum and the side frame members.

11 Claims, 9 Drawing Sheets

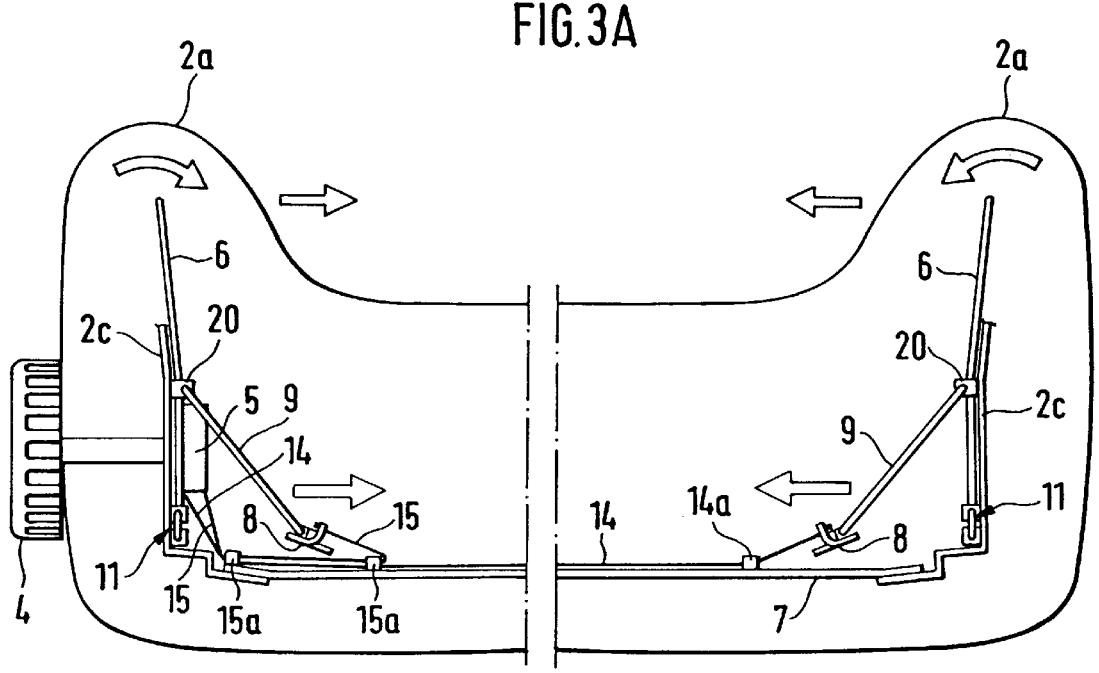
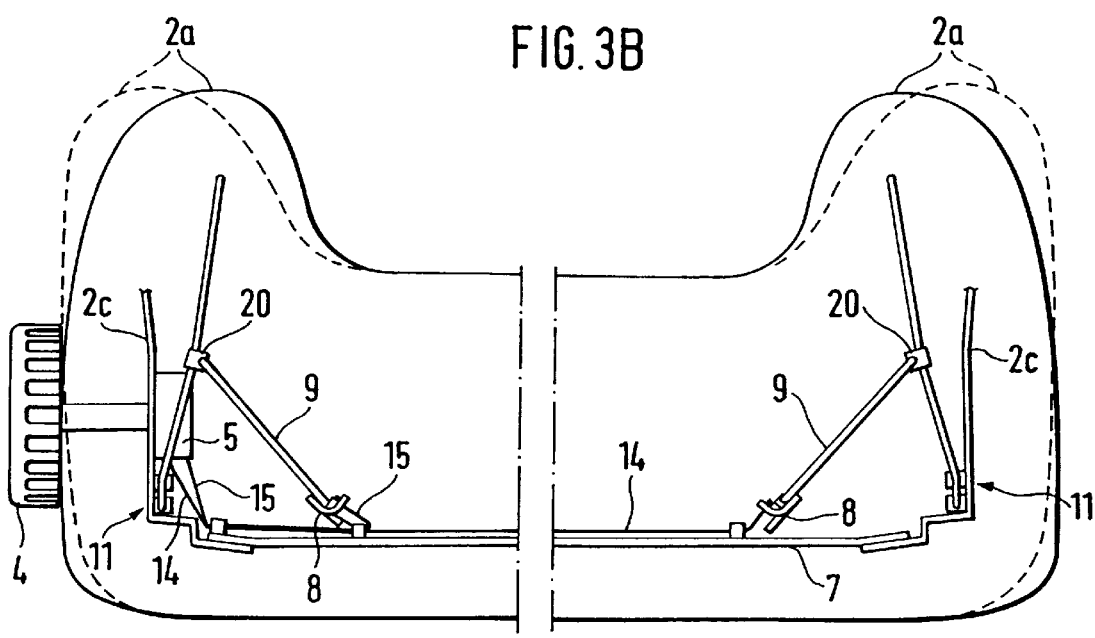

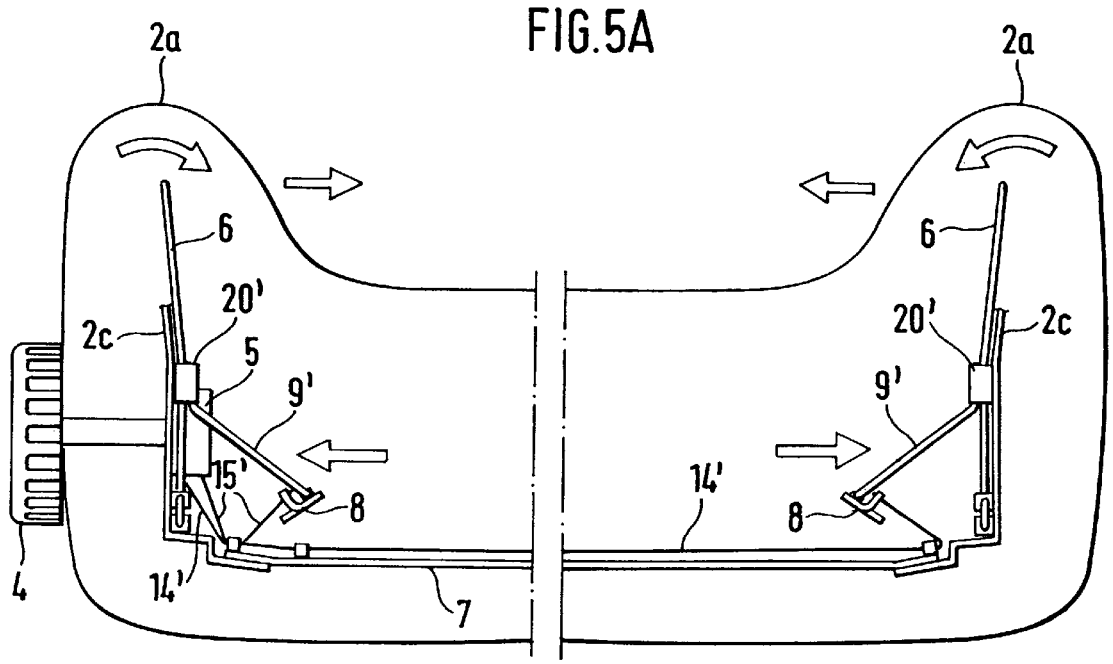
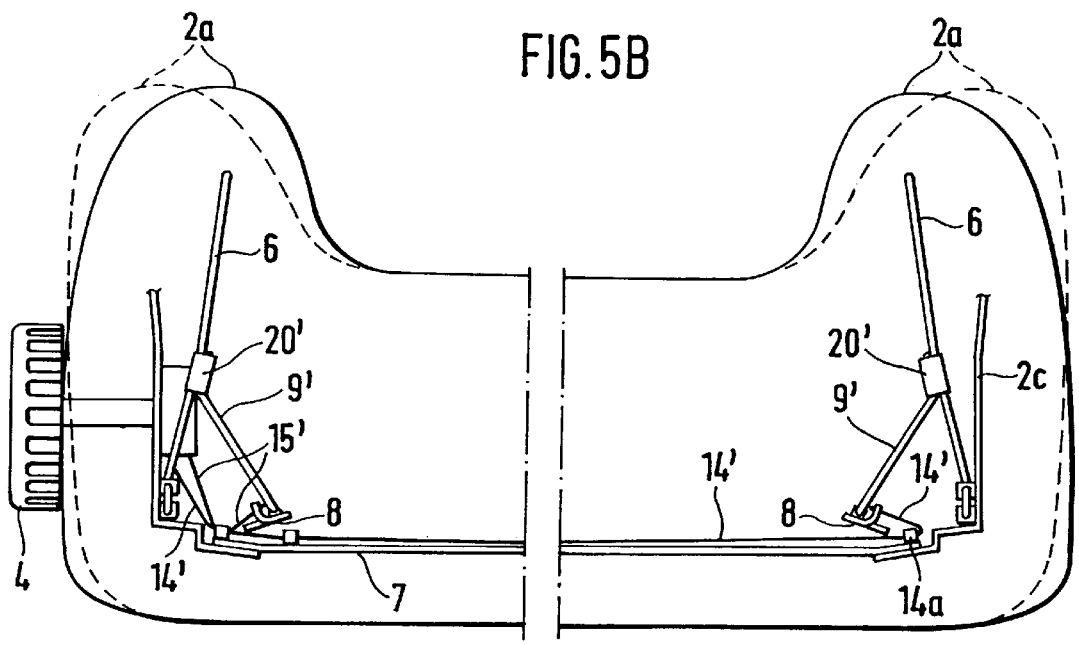

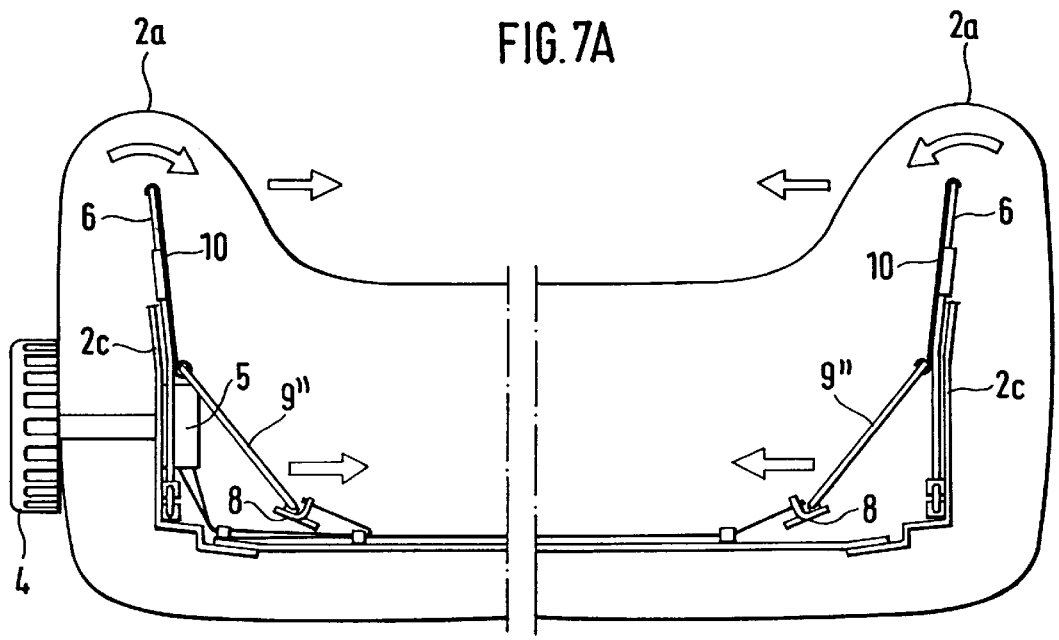
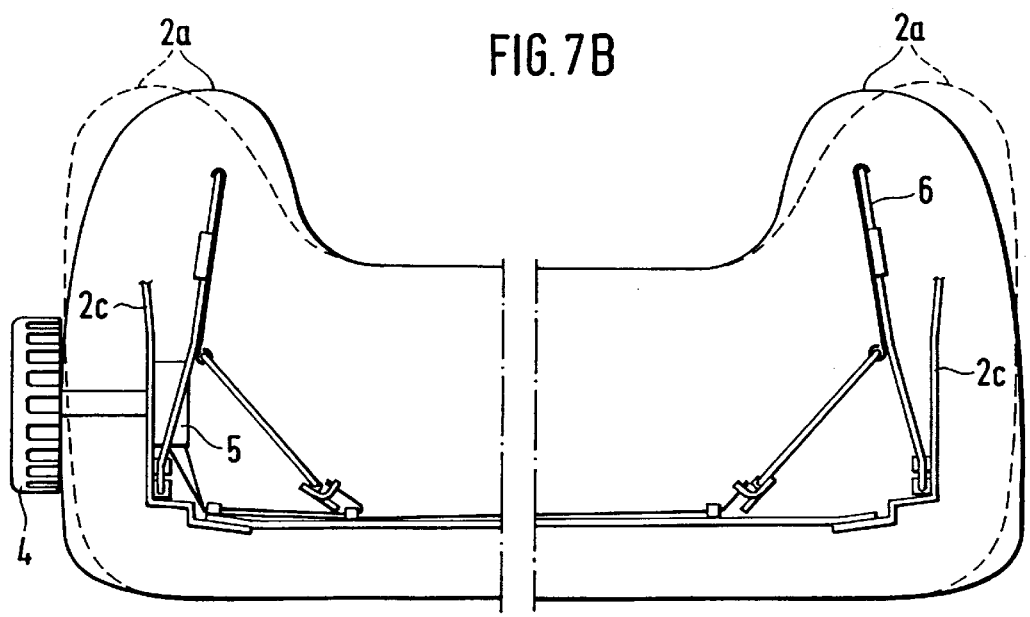

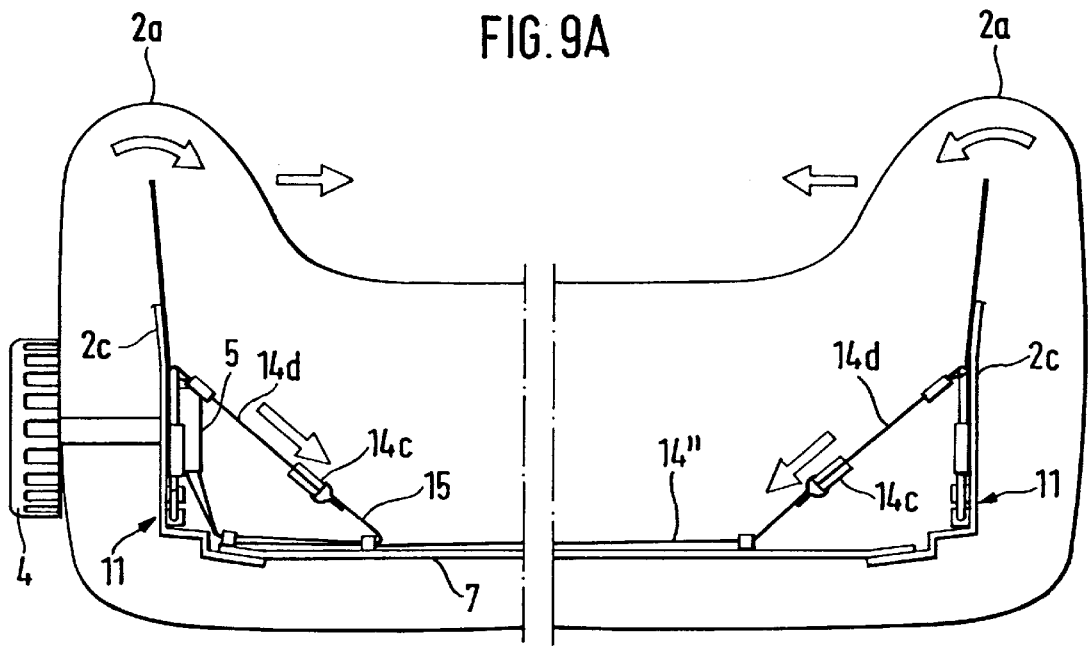
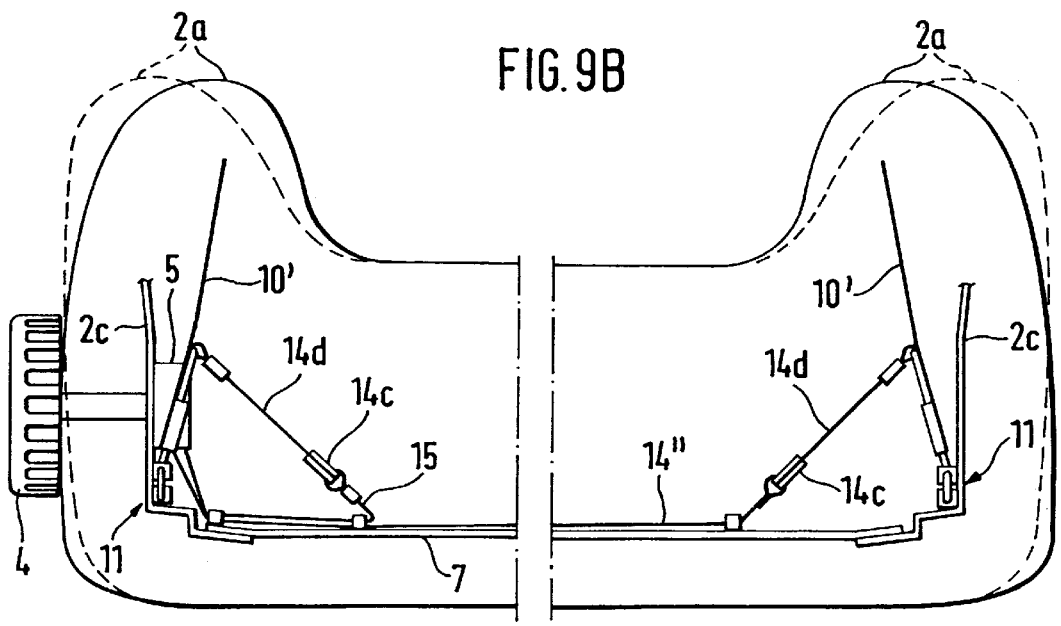

ADJUSTMENT MECHANISM FOR THE SIDE SUPPORT PANELS OF A SEAT BACK

FIELD OF INVENTION

The present invention relates to seats of the type having a pair of side support panels which extend forward from the seat back. Such seats are used, for example, in automobiles.

BACKGROUND OF THE INVENTION

French patent publication No. 2,276,798 discloses a seat having a pair of side support panels whose position is adjustable using a pair of U-shaped tubular frame members. The base of the U-shaped frame extends forward, and the posterior ends have a pair of holes. These holes are slipped onto bearing pins integral with the seat back frame such that the U-shaped frame members may pivot. Each U-shaped frame member is urged outwardly by a separate flexural spring. The angle through which the frame members can pivot is limited by a stop portion which contacts a portion of the frame.

This known device is costly, insofar as it requires the use of relatively costly bearing pins, requires that the pins be in accurate alignment with one another, and requires mounting a separate spring element as part of the assembly.

SUMMARY OF THE INVENTION

The present invention is a seat back having a pair of adjustable side support panels, in which the adjustment mechanism is relatively simple, easy to manufacture, and light weight.

More particularly, a mechanism for adjusting the position of the side support panels of a seat back comprises a pair of forwardly projecting side frame members which are secured at one end against rotation relative to the seat back frame. At least that portion of each side frame member near to the attached end is made of spring steel, so that the side frame members can be cantilevered toward or away from one another, against the force of the spring steel, about axes which are substantially parallel to one another.

Preferably, each side frame member has a generally U-shaped configuration, so as to have a pair of generally parallel leg portions, and terminates in end portions which are fixedly secured relative to said seat back frame. In a preferred embodiment, the end portions extend from the leg portions at an angle thereto, preferably a right angle, and are secured against rotation relative to the frame at a distance from where the first end portion joins the leg portion. As a result, movement of the opposite ends of the side frame members towards or away from one another will create torsion in the first end member, such that the first end portion acts as a torsional spring. Preferably, the first end portions are round in cross-section.

In a preferred embodiment, each end portion includes a first end portion perpendicular to the leg portion, i.e., in the form of a crank, a second end portion which extends from the first end portion at least generally parallel to the leg portion, and a third end portion which extends from the second end portion at least generally parallel to the first end portion. A first bearing, which is fixed to the seat back frame, has a hole through which the first end portion passes. A second bearing, which is also fixed to the seat back frame, secures the third end portion. Because the third end portion, and consequently the second end portion, are constrained against movement, moving the side frame members toward or away from their neutral positions will torque the first end portion.

Preferably, the positions of the side frame members are adjusted using a rotary knob coupled to a drum. A cord member extends between the drum and the side frame members, so that turning the drum winds the cord on the drum and pulls the side frame members toward or away from one another. In one embodiment, the cords are connected to tensioning bars, one associated with each side frame member, which are parallel to one another and moveable toward and away from one another. Connecting links, coupled between the tensioning bars and the side frame members at a distance from the attached ends of the side frame members, transfer the movement of the cord to the side frame members. In an alternative embodiment, a pair of cord segments are connected to the side frame members at vertically spaced locations. A cord is connected between the drum and each pair of cord segments for moving the free ends of the side frame members toward or away from one another.

If desired, a plate may be mounted on the forward end of one or both of the side frame members. In one embodiment, the leg portions include a connector portion, at an end opposite to the first end portions, which extends at least generally parallel to the first portions. The connector fourth portions and also the leg portions are secured to the plate in bearings so that the plate forms part of the side frame member.

Compared to the prior art described above, a seat back according to the invention is relatively simple in construction, insofar as the side frame members permit the side support panels to be adjustable, and at the same time bias the support panels toward their initial positions, without the requirement for additional spring elements or a complex pivot mounting.

For a better understanding of the invention, reference is made to the following detailed description of a preferred embodiment, taken in conjunction with the drawings accompanying the application.

BRIEF DESCRIPTION OF THE DRAWINGS

FIGS. 3a and 3b show a top view of the seat structure in its initial position and with the side supports adjusted inwardly, respectively;

FIGS. 5a and 5b are views corresponding to FIGS. 3a and 3b of the FIG. 4 embodiment;

FIGS. 7a and 7b are views corresponding to FIGS. 3a and 3b of the FIG. 6 embodiment;

FIGS. 9a and 9b are views corresponding to FIGS. 3a and 3b of the FIG. 8 embodiment.

In the above figures, corresponding parts in the various embodiments are marked with the same reference numerals, except that parts which are modified in different embodiments are marked with a prime.

DETAILED DESCRIPTION OF PREFERRED EMBODIMENTS

Figure 1:
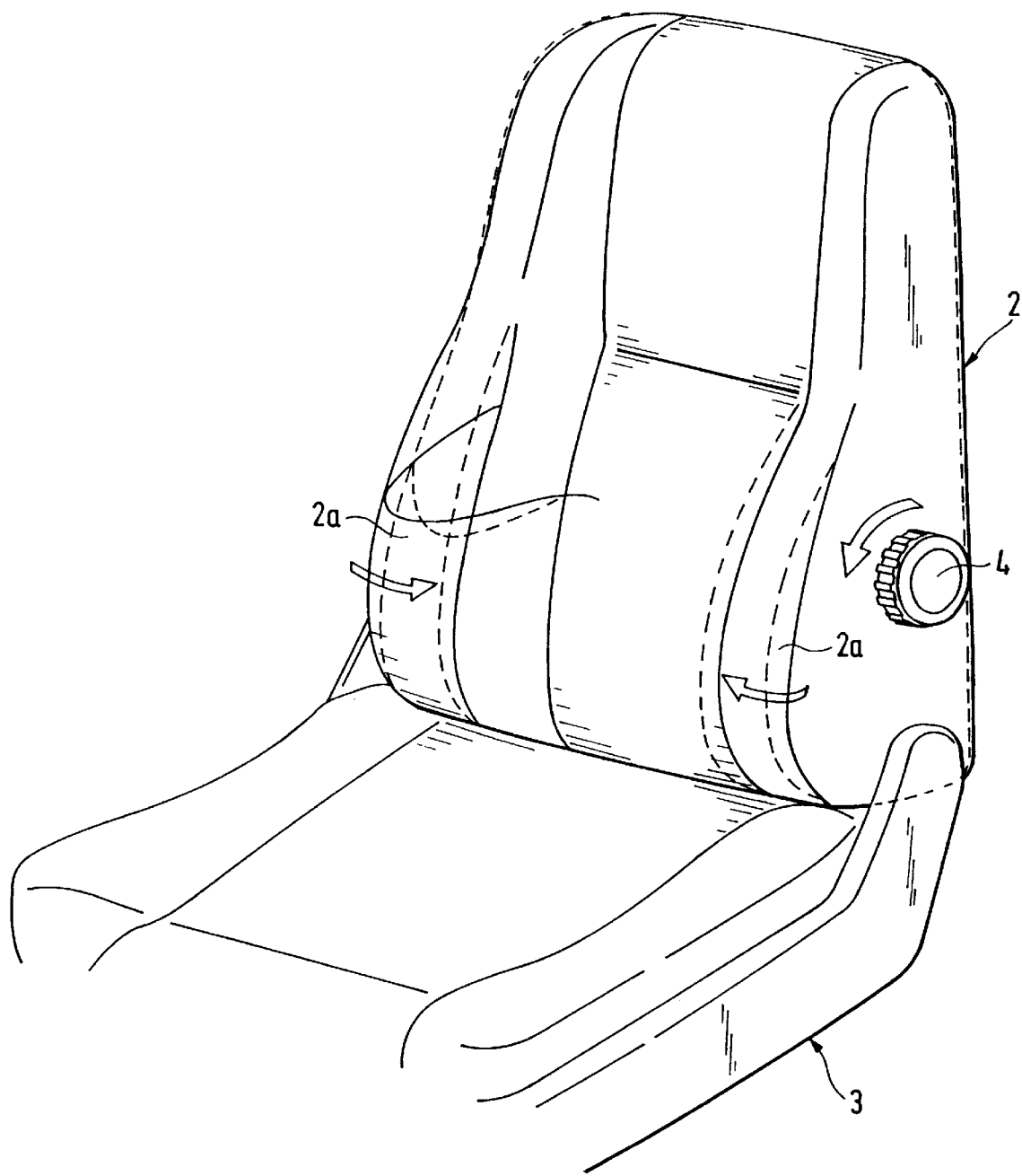
FIG. 1 is a perspective front view of an upholstered car seat with a pair of side support panels which are adjusted by a rotatable knob mounted on the side of the seat back.
Figure 2:
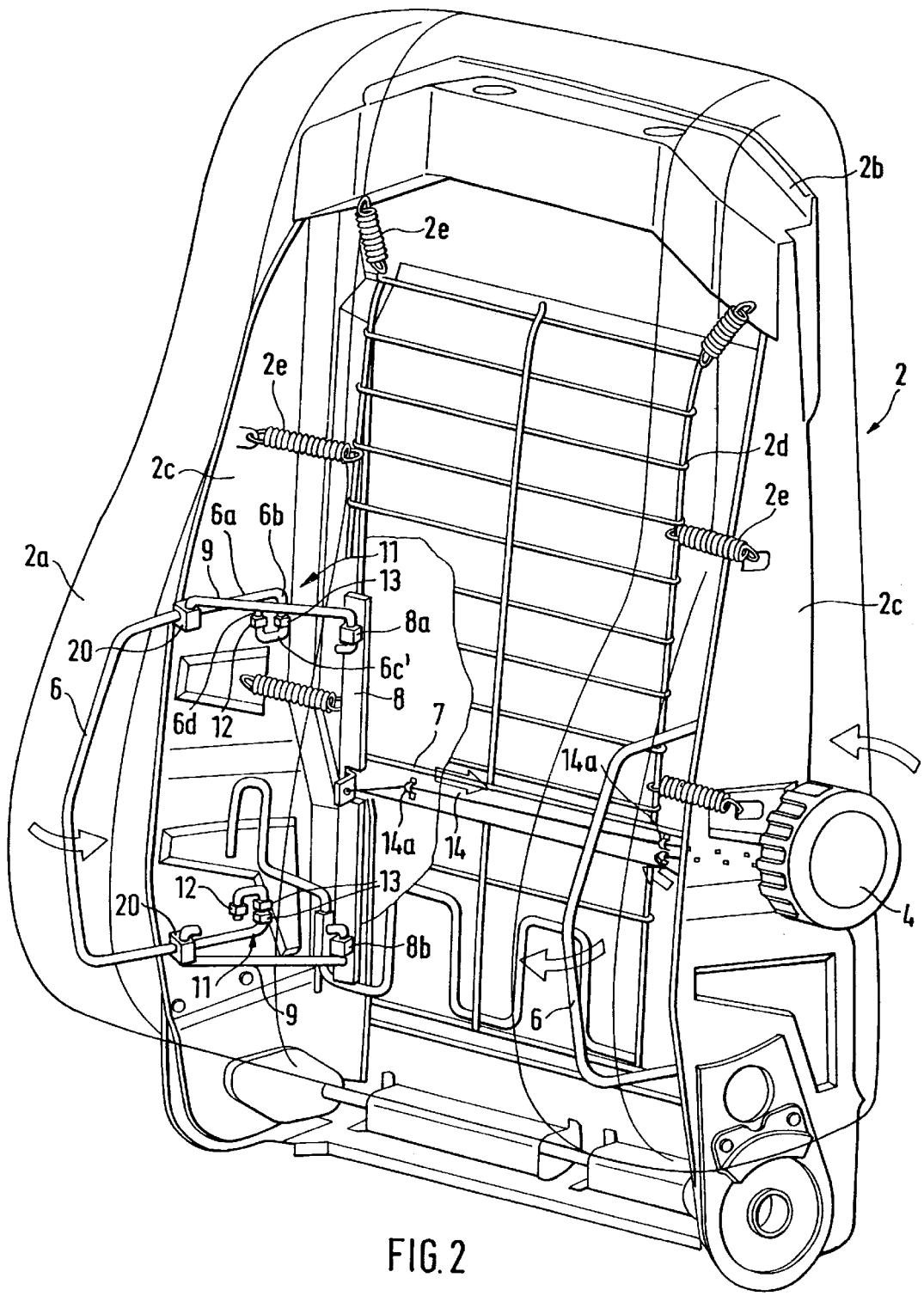
FIG. 2 is a perspective front view, partially in section, of the inner construction of the seat back of the seat shown in FIG. 1.

Referring to FIGS. 1–3, a seat includes a seat back 2 coupled to a seat portion 3. The seat back 2 includes a pair of side support panels 2a which extend forward from the seat back 2. The side support panels 2a are adjustable towards one another, as shown by the arrows and broken lines in FIG. 1, by rotating an adjustment knob 4.

Referring to FIGS. 2, 3a, and 3b, the interior of the seat back 2 includes a frame having a transverse member 2b and a pair of side members 2c welded thereto. A back rest support mat 2d is suspended from the seat back frame by a plurality of springs 2e. The structure described thus far represents a typical automobile seat construction.

In accordance with a first embodiment, the adjustment mechanism for the side support panels includes a pair of essentially U-shaped side frame members 6 made of round spring steel rod. The posterior ends of the frame members 6 include a pair of horizontal leg portions 6a. The base of the side frame members 6 (i.e., the portion connecting the two leg portions 6a) points forward. The posterior ends of said side frame members 6 terminate in end portions comprising a first end portion 6b which is perpendicular to the leg portion 6a (i.e., is vertical), a second end portion 6c which extends parallel to the leg portion 6a (i.e., horizontal), and a third end portion 6d which extends parallel to the first end portion 6b (i.e., vertical).

The first end portion 6b passes through aligned holes in a pair of first bearings 13, which are fixed to the side portions 2c of the seat back frame 2. The bearings 13 are vertically spaced so as to support the upper and lower ends, respectively, of the first end portion 6b, but the bearings 13 do not constrain the first end portions 6b against rotation. A second bearing 12, also fixed to the side portions 2c includes a hole through which the third end portion 6d passes.

Accordingly, the lower end of the first end portion 6b is constrained against rotation by the second bearing member 12, acting through the second and third end portions 6c, 6d. Other than at its lower end, i.e., where it joins the second end portion 6c, the first end portion 6b is not constrained against rotation. As a result, movement of the leg portions 6a toward or away from one another will cause the first end portion 6b to act as a torsional spring. As shown, the posterior portion of the side frame members 6, i.e., the leg portions 6a and end portions 6b, 6c, 6d, and the bearings 12 and 13, are of lightweight construction.

A pair of connector links 9 are articulated to the upper and lower leg portions 6a, respectively, of each side frame member 6 by couplings 20 located at a distance from the points of attachment 11. The connector links 9 are pivotably coupled at their opposite ends to a tensioning bar 8 by couplings 8a. As can be seen in FIGS. 3a and 3b, the configuration of each of the two side frame members 6 and tensioning bars 8, as well as the connector links 9 and couplings 12, 13 associated with each side frame member 6, is the same, except that they are mirror images of one another.

Each tensioning bar 8 is acted upon by a tensioning cord 14, 15, respectively, which cords extend from a drum 5. The cord 14 passes through a guide 14a fixed on a transverse frame member 7. Cord 15 passes through a guide 15a, where its direction is reversed prior to being attached to its respective tensioning bar 8.

The two tensioning cords 14, 15 are wound on the drum 5 by means of a rotatable adjustment knob 4. By rotating the knob 4, the cords 14, 15 pull the respective tensioning bars 8 toward one another. In such a manner, the connecting links 9 pull the couplings 20, thereby moving the forward ends of the side frame members 6 toward one another, as shown by the arrows in FIGS. 2 and 3a. Thus, when the adjustment knob 4 is rotated in one direction, e.g., counterclockwise, the side support panels 2a will move from the position shown in FIG. 3a to the position shown in FIG. 3b.

As the free ends of the side support panels move towards one another, the rotational movement of the leg portions 6a is transmitted to the first end portions 6b. However, as described above the lower ends of the first end portions 6b are constrained against any rotational movement by the second bearing 12, acting on the second and third end portions 6c, 6d. As a result, rotating the leg portions 6a from the position shown in FIG. 3a to the position shown in FIG. 3b creates torsion within the first end portion 6b. When the knob 4 is rotated in the opposite direction, and tension on the cords 14, 15 is relaxed, the torsional spring force of the first end portion 6b will cause the side frame members 6 to return to their original positions (FIG. 3a).

Figure 4:
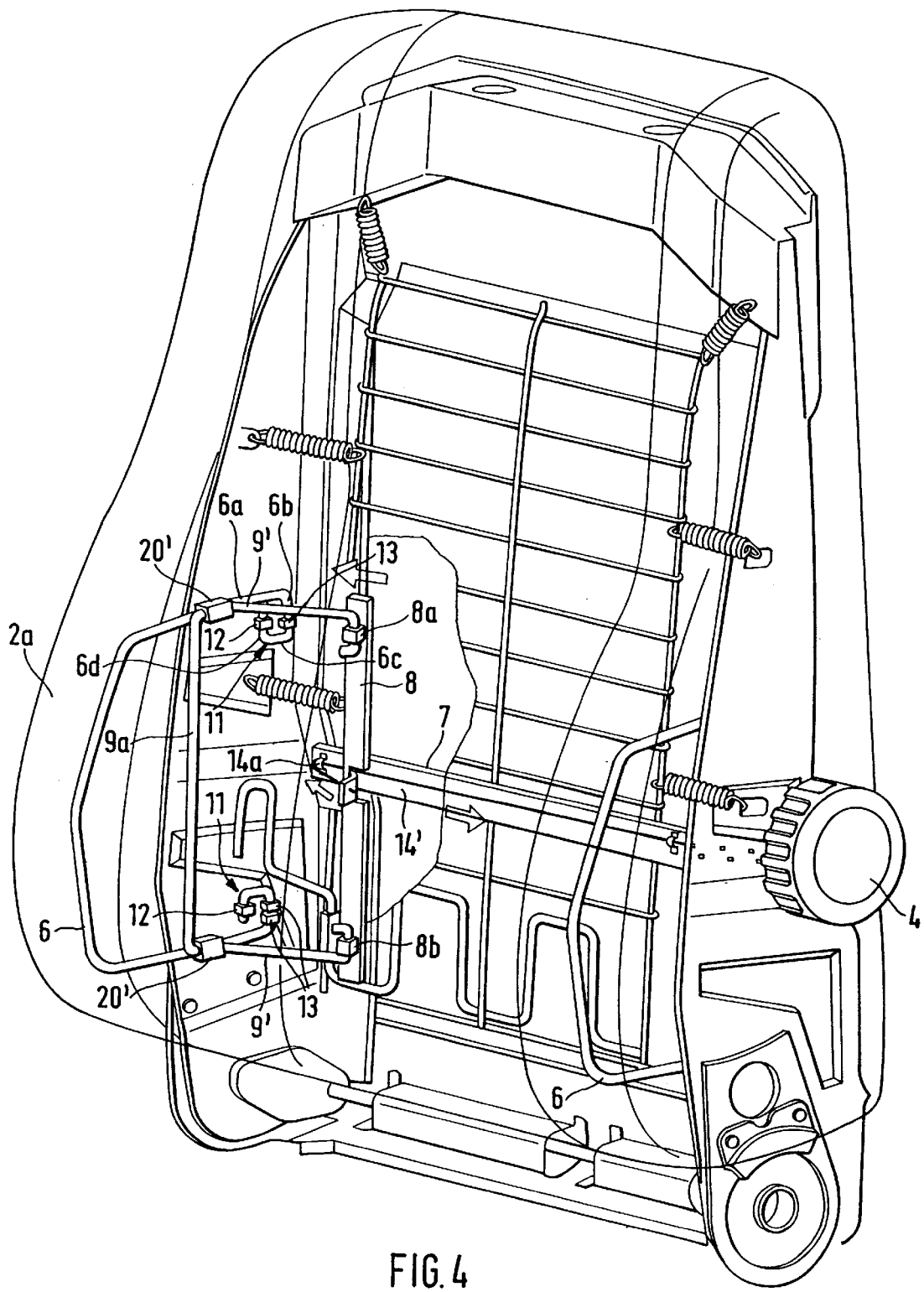
FIG. 4 is a view, similar to FIG. 2, of a second embodiment of a seat back.

A second embodiment of the invention, which is shown in FIGS. 4, 5a, and 5b, differs from the first embodiment only in that a different linkage is employed. In particular, the linkage has a one-piece link 9' with two horizontal legs, parallel to one another, joined integrally by a vertical connecting portion 9a. One end of each horizontal leg is coupled to the side frame member 6 in a coupling 20', whereas the other end is articulated to the tensioning bar 8 by another coupling 8a.

Another difference between the embodiment of FIG. 2 and FIG. 4 is that, in the latter embodiment, the tensioning cord 14' is passed through an outer guide 14a prior to the point of connection to the tensioning bar 8, so that its direction is reversed prior to being connected to the tensioning bar 8. In contrast, the direction of the tensioning cord 15' is not reversed, such that the cords 14' and 15' pull the tensioning bars 8 in directions generally opposite to the first embodiment. However, due to the angle of the connecting links 9', and the fact that the side frame members 6 are cantilevered relative to the seat back frame 2c, pulling the links 9' outwardly and rearwardly will cause the side frame members 6 to move towards one another, as shown by FIGS. 5a and 5b.

Figure 6:
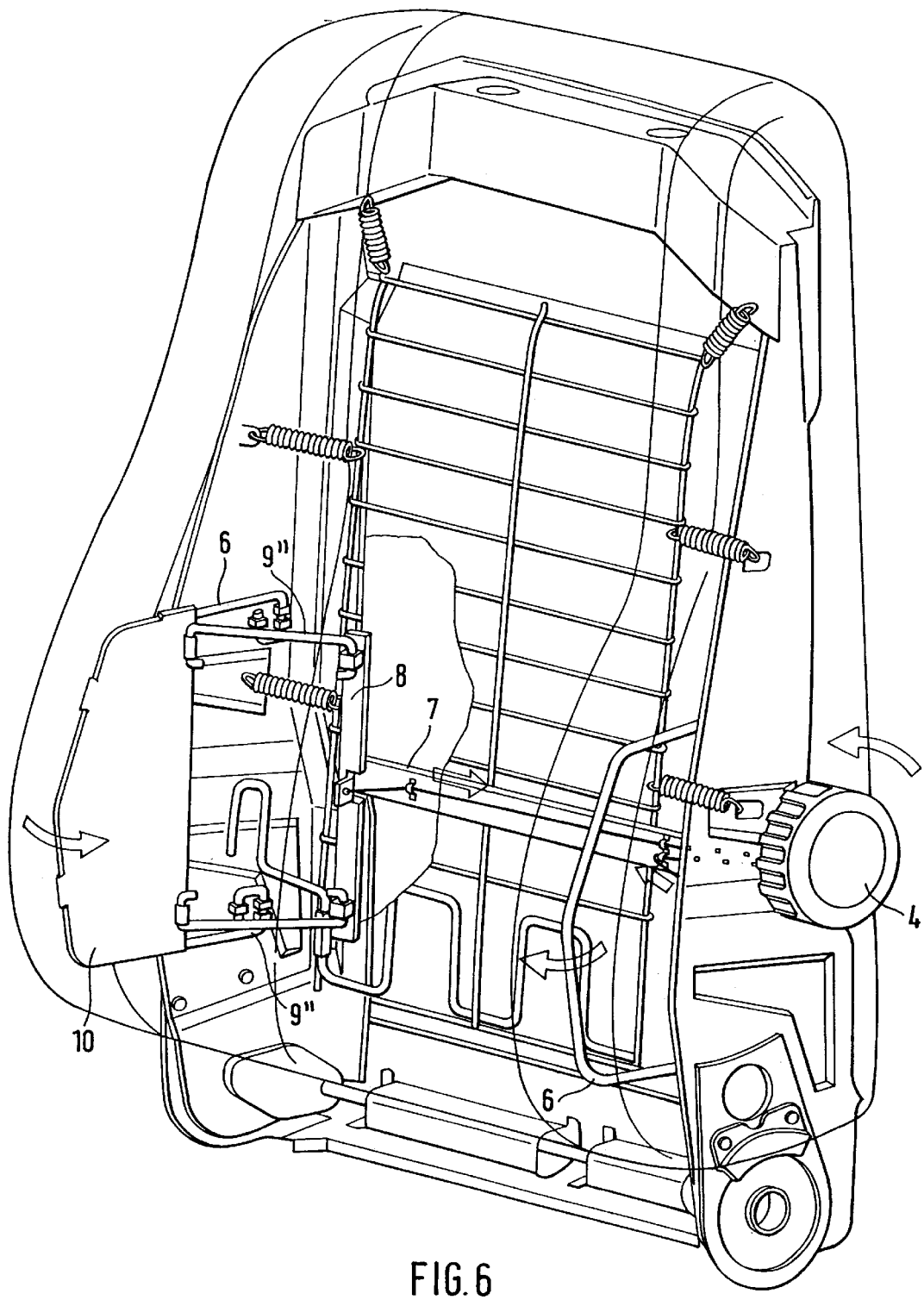
FIG. 6 is a view similar to FIG. 2, of a third embodiment of a seat back.

The embodiment of FIGS. 6, 7a, and 7b differs from the embodiment of FIG. 2 in that a plate 10 is mounted on the forward portion of the side frame member 6, and in that the connecting links 9" are pivotably coupled to the plate 10 rather than to the side frame member 6.

Figure 8:
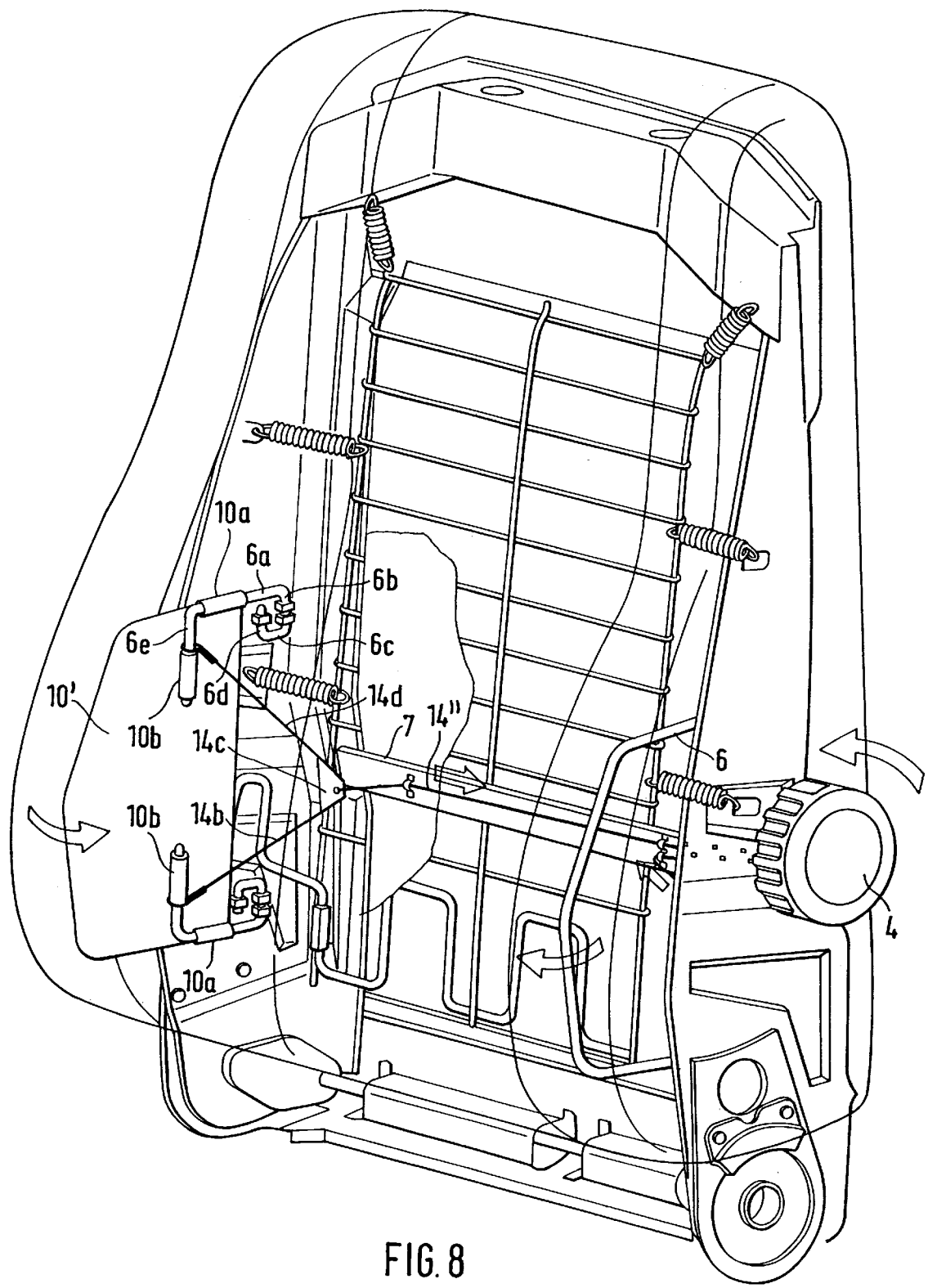
FIG. 8 is a view, similar to FIG. 2, of a fourth embodiment of a seat back.

In the embodiment shown in FIGS. 8, 9a, and 9b, an anterior plate 10' forms part of the side frame member. The leg portions 6a include, at their ends opposite to the first end portion 6b, a pair of connector portions 6e which extend at right angles from the leg portions 6a. The leg portions 6a extend through bearings 10a, and the connector portions 6e extend through bearings 10b, which are fixed on the plate 10'. Because the leg portions 6a and connector portions 6e are received in two bearings which are at right angles to one another, the plate 10' and legs 6a are secured against relative movement.

In FIG. 8, for simplicity only one of the side support members is shown as including the plate 10'. As shown in FIG. 9a, however, normally both side support members would include the plate 10'. Each plate 10' is acted upon by two cord segments 14b and 14d, which pass over a triangular connecting part 14c. A cord 14" is connected between one of the parts 14c and the drum 5. A second cord 15 is connected between the other connecting part 14c and the drum. In this embodiment, the part 14c replaces the tensioning bar, and the cord segments 14b, 14d replace the connecting links 9.

The foregoing represents preferred embodiments of the invention. Variations and modifications will be apparent to persons skilled in the art, without departing from the inventive concepts disclosed herein. For example, means other than journaling the first end portion 6b in bearings 13, and using crank portions 6c, 6d and bearing 12, may be used to constrain the lower end only of the first end portion 6b against rotation. Similarly, in the embodiment of FIG. 8, other means may be employed to attach the plates 10', such as welding. Also, while a pair of cords have been provided to act on the two respective side frame members, a single cord from the drum can be routed so as to act on both side support members, e.g., act on both tensioning bars 8 or on both connecting parts 14c. All such modifications and variations are intended to be within the skill of the art, as defined in the following claims.

I claim:

1. In a seat back having a seat back frame and a pair of side support panels, a mechanism for adjusting the position of the side support panels comprising:

a pair of side frame members, each side frame member having an end secured against rotation relative to said seat back frame, wherein at least a portion of each said side frame member near to the end secured against rotation is made of spring steel, and wherein the ends secured against rotation are attached to said frame in a manner such that opposite ends of said side frame members can be cantilevered toward or away from one another, against a force of said spring steel, about axes which are substantially parallel to one another.

2. A seat back according to claim 1, wherein each said side frame member has a generally U-shaped configuration, so as to have a pair of generally parallel leg portions, and terminates in end portions, extending from said leg portions, which are fixedly secured relative to said seat back frame.

3. A seat back according to claim 2, wherein each end portion extends from one of the leg portions at an angle thereto, and wherein said end portions are fixedly secured against rotation relative to said frame at a distance from said leg portions, such that movement of said opposite ends towards or away from one another creates at least some torsion in said end portions for opposing such movement.

4. A seat back according to claim 3, wherein each of said end portions has a first end portion having a length and extending from said leg portions perpendicular thereto, and wherein said first end portions are secured against rotation, relative to said seat back frame, only at an end opposite to said leg portions, so that movement of said opposite ends towards or away from one another is opposed by torsion along the length of each said first end portion and said first end portion acts as a torsional spring.

5. A seat back according to claim 4, wherein said end portions include a second end portion, which extends from said first end portion at an end opposite to said leg portions generally at right angles to said first end portion, and wherein said second end portion is secured against movement relative to said frame, thereby constraining said first end portion against rotation.

6. A seat back according to claim 5, wherein said seat back frame includes a principal plane, wherein said leg portions extend from said end portions in a direction at least generally perpendicular to said principal plane, wherein said first end portion is round in cross-section, and wherein each end portion further includes a third end portion which extends from said second end portion at least generally parallel to said first end portion, and further comprising a first bearing which is fixed to said frame and which has a hole in which said first end portion is rotatably retained, and a second bearing fixed to said frame and in which said third end portion is secured, such that said second bearing opposes rotation of said first end portion.

7. A seat back according to claim 6, further comprising a rotary knob coupled to a drum, and at least one cord member secured at one end to said drum and, at an opposite end, coupled to said side frame members.

8. A seat back according to claim 7, further comprising a tensioning bar associated with each side frame member, wherein said tensioning bars are parallel to one another and moveable toward and away from one another, wherein said opposite ends of said cord members act on said tensioning bars, and further comprising connecting links coupled between said tensioning bars and said side frame members at a distance from the ends secured against rotation.

9. A seat back according to claim 8, wherein said leg portions include a connector portion, at an end opposite to said first end portions, which extends at least generally parallel to said first end portions and which are secured to said plate, such that said plate forms part of said side frame member.

10. A seat back according to claim 7, further comprising a plate mounted on said opposite end of at least one side frame member.

11. A seat back according to claim 7, wherein said at least one cord member includes a pair of cord segments connected to each side frame member at vertically spaced locations, and a cord member connected between each said pair of cord segments and said drum.

* * * * *